United States Patent [19]

Halasa et al.

[11] Patent Number: 5,254,653

[45] Date of Patent: * Oct. 19, 1993

[54] TERPOLYMER RUBBER OF STYRENE, ISOPRENE AND BUTADIENE

[75] Inventors: Adel F. Halasa, Bath, Ohio; Jean Bergh, Vianden, Luxembourg; Fernand A. J. Fourgon, Bastogne, Belgium

[73] Assignee: The Goodyear Tire & Rubber Company, Akron, Ohio

[*] Notice: The portion of the term of this patent subsequent to Sep. 10, 2008 has been disclaimed.

[21] Appl. No.: 884,351

[22] Filed: May 18, 1992

Related U.S. Application Data

[62] Division of Ser. No. 458,069, Dec. 28, 1989.

[51] Int. Cl.[5] ............................................. C08F 236/10
[52] U.S. Cl. ........................................ 526/337; 526/65; 526/73; 526/340; 525/236; 525/237
[58] Field of Search ................... 526/340, 337, 65, 73

[56] References Cited

U.S. PATENT DOCUMENTS

| | | | |
|---|---|---|---|
| 2,653,145 | 9/1953 | Hohenstein | 526/337 X |
| 3,294,768 | 12/1966 | Wofford | 526/335 X |
| 4,051,199 | 9/1977 | Udipi et al. | 526/173 X |
| 4,073,737 | 2/1978 | Elliott | 252/51.5 A |
| 4,137,391 | 1/1979 | Smith et al. | 526/178 |
| 4,152,370 | 5/1979 | Moczygemba | 260/880 B |
| 4,277,591 | 7/1981 | Naylor | 526/174 |
| 4,413,098 | 11/1983 | Hattori et al. | 526/314 |
| 4,424,322 | 1/1984 | Hattori et al. | 526/175 |
| 4,446,290 | 5/1984 | Ikematu et al. | 526/174 |
| 4,530,985 | 7/1985 | Broekhuis | 526/181 |
| 4,537,936 | 8/1985 | Takao et al. | 525/236 |
| 4,553,578 | 11/1985 | Vitus et al. | 526/340 X |
| 4,588,782 | 5/1986 | Ono et al. | 525/245 |
| 4,673,709 | 6/1987 | Nordsiek et al. | 525/99 |
| 4,742,117 | 5/1988 | Tsutsumi et al. | 525/98 |
| 4,814,386 | 3/1989 | Hellermann et al. | 525/258 |
| 4,843,120 | 6/1989 | Halasa et al. | 526/173 X |
| 5,047,483 | 9/1991 | Halasa et al. | 525/237 |

FOREIGN PATENT DOCUMENTS

| | | |
|---|---|---|
| 0019100 | 11/1980 | European Pat. Off. |
| 0192424 | 8/1986 | European Pat. Off. |
| 0302196 | 2/1989 | European Pat. Off. |
| 0304589 | 3/1989 | European Pat. Off. |
| 3310118 | 12/1983 | Fed. Rep. of Germany |
| 3414657 | 12/1984 | Fed. Rep. of Germany |
| 1461391 | 11/1966 | France |
| 59-64645 | 4/1984 | Japan |
| 1060685 | 3/1967 | United Kingdom |
| 1108708 | 4/1968 | United Kingdom |
| 1144603 | 3/1969 | United Kingdom |
| 2098616 | 11/1982 | United Kingdom |

*Primary Examiner*—Fred Teskin
*Attorney, Agent, or Firm*—Henry C. Young, Jr.

[57] ABSTRACT

A styrene, isoprene, butadiene terpolymer rubber with a characterization according to its glass transition temperatures and unit structure and a pneumatic tire with a tread composed of such terpolymer rubber specifically in combination with selected other rubber.

5 Claims, No Drawings

TERPOLYMER RUBBER OF STYRENE, ISOPRENE AND BUTADIENE

This is a divisional of application Ser. No. 07/458,069, filed on Dec. 28, 1989, presently pending.

FIELD

This invention relates to styrene, isoprene, butadiene terpolymer rubber and to tires having treads composed of compositions thereof.

BACKGROUND

Pneumatic rubber passenger and truck tires are composed of elements which conventionally include a tread of a rubber composition. The tread rubber is sometimes desirably compounded to provide a tire with a relatively low rolling resistance with reasonable wear and traction.

Although it may be desired to compound the tire's tread composition to reduce the rolling resistance of the tire without substantially reducing the tire's traction features, tire traction might be expected to be somewhat sacrificed as may be evidenced by its decrease in wet and dry skid resistance.

Various rubber compositions have been prepared for various purposes, some of which have included the tire treads. Often tire treads are composed of synthetic rubber or blends of synthetic rubber with natural rubber for the purpose of achieving desirable tire tread characteristics such as wear, traction and reduction in rolling resistance. Various synthetic rubbers have been used in the manufacture of tires with such treads including styrene/butadiene copolymers (prepared by emulsion or solution polymerization methods) sometimes referred to as SBR, high cis 1,4 polybutadiene rubber as well as high and medium vinyl (1,2-) polybutadiene rubbers. Sometimes a synthetic cis 1,4-polyisoprene may, at least in part, be substituted for the natural rubber in tire tread compositions.

Although such rubber compositions are taught to provide various benefits, some for tire treads, it continues to be desirable to provide a pneumatic tire having a rubber tread having an enhanced rolling resistance and/or treadwear commensurate with reasonable traction qualities.

DISCLOSURE AND PRACTICE OF INVENTION

In accordance with this invention, a styrene, isoprene, butadiene terpolymer rubber (hereinafter referred to as SIBR) is provided which is comprised of (A) about 5 to about 40, preferably about 10 to about 35 weight percent bound styrene, (B) about 20 60, preferably about 30 to about 50, weight percent bound isoprene and (C) about 10 to about 50, preferably about 30 to about 40, weight percent bound butadiene and is characterized by having a glass transition temperature (Tg) in the range of about $-70°$ C. to about $-5°$ C. and, further, the said bound butadiene structure contains about 10 to about 50, preferably about 30 to about 40, weight percent 1,2-vinyl units, the said bound isoprene structure contains about 10 to about 40, preferably about 10 to about 30, weight percent 3,4 units and the sum of the weight percent 1,2-vinyl units of the bound butadiene and the weight percent 3,4 units of the bound isoprene is in the range of about 20 to about 90, preferably about 40 to about 70, percent.

In further accordance with this invention, such a SIBR is provided having a Tg in the range of about $-10°$ C. to about $-40°$ C. characterized in that its bound styrene content is in the range of about 30 to about 60 weight percent, and the sum of the weight percent 1,2 vinyl units of the bound butadiene and the weight percent 3,4 units of the bound isoprene is in the range of about 20 to about 45.

In further accordance with this invention, such a SIBR is provided having a Tg in the range of about $-10°$ C. to about $-40°$ C. characterized in that its bound styrene content is in the range of about 10 to about 30 weight percent, and the sum of the weight percent 1,2 vinyl units of the bound butadiene and the weight percent 3,4 units of the bound isoprene is in the range of about 45 to about 90.

In further accordance with this invention, such a SIBR is provided having a Tg in the range of about $-50°$ C. to about $-70°$ C. characterized in that its bound styrene is in the range of about 10 to about 30 weight percent, and the sum of the weight percent 1,2 vinyl units of the bound butadiene and the weight percent 3,4 units of the bound isoprene is in the range of about 20 to about 45.

In further accordance with this invention, a pneumatic tire is provided having an outer circumferential tread where said tread is a sulfur cured rubber composition comprised of, based on 100 parts by weight rubber (phr), (A) about 10 to about 90, preferably about 25 to about 70, parts by weight of the said styrene, isoprene, butadiene terpolymer rubber (SIBR) and (B) about 70 to about 30 weight percent of at least one of cis 1,4-polyisoprene rubber and cis 1,4-polybutadiene rubber.

In the description of this invention, the cis 1,4-polyisoprene rubber includes both natural and synthetic rubber. Often, the natural rubber is preferred. The cis 1,4-polyisoprene rubber, natural or synthetic, typically has a cis 1,4-content of about 96 to about 99 weight percent.

The polybutadiene rubber can be composed of about 95 percent or more of cis 1,4 structure when prepared with Ziegler-type catalyst or can be composed at least about 90 percent cis and trans 1,4 structure when prepared with alkyl lithium catalyst. Both types of rubbers are well known.

The terms butadiene and polybutadiene as used herein refer to 1,3-butadiene and polymers derived from 1,3-butadiene, respectively.

The terms bound styrene, bound butadiene and bound isoprene refer to the structure of such materials when they have been terpolymerized to form the SIBR terpolymer.

The percent 1,2 vinyl units of the bound butadiene is based on the bound butadiene itself and the percent 3,4 units of the bound isoprene is based on the bound isoprene itself and the sum thereof is in the sum of such percentages.

A preferred embodiment of the invention, particularly for tires to be used for somewhat conventional loads and speeds such as passenger vehicle tires, although the embodiment is not necessarily limited to such use, is a pneumatic tire provided with such tread where said tread is a sulfur cured rubber composition comprised of, based on 100 parts by weight rubber, (A) about 20 to about 90 phr of the SIBR and (B) about 10 to about 80 phr of said natural rubber.

Such pneumatic tires are conventionally comprised of a generally toroidal shaped carcass with an outer circumferential tread, adapted to be ground contacting, spaced beads and sidewalls extending radially from and connecting said tread to said beads.

The rubbers used herein, particularly those in the higher ML-4 (Mooney) viscosity range, can optionally be individually oil extended before or during mixing with various rubber compounding materials for ease of processing. If oil extension is used, usually about 10 to about 50 phr of rubber processing oil is used, usually of the aromatic or aromatic/paraffinic oil type, to provided a ML-4 (100° C.) viscosity of about 40 to about 100, preferably about 60 to about 90, for the uncured rubber composition.

It should readily be understood by one having skill in the art that said tread portion of the pneumatic tire as well as the rubber or other material in the basic carcass, which normally contains reinforcing elements in the tread region, can be compounded by methods generally known in the rubber compounding art, such as mixing the various constituent rubbers with various materials such, as for example, curing aids, such as sulfur and accelerators, processing additives, such as oils, resins, silicas, and plasticizers, fillers, pigments, antioxidants and antiozonants and reinforcing materials such as, for example, carbon black.

The tire can be built, shaped, molded and cured by various methods which will be readily apparent to those having skill in the art.

In the practice of this invention, the polymer blend-tread can be integral with and adhered to various tire carcass substrate rubber compositions. Typically, such a rubber composition is at least one of a butadiene/styrene copolymer rubber, cis 1,4 polyisoprene (natural or synthetic rubber) and 1,4 polybutadiene. Optionally, such a blend for a portion of the tread, particularly where the tread is in the region of the sidewall area of the tire may contain one or more of butyl rubber, halobutyl rubber, such as chlorobutyl or bromobutyl rubber, and ethylene/propylene/conjugated diene terpolymer rubber, polyisoprene and polybutadiene rubber.

In the further practice of this invention, the tread can typically be applied in the building of the green tire in which the uncured, shaped tread is built onto the carcass following which the green tire is shaped and cured.

Alternately, the tread can be applied to a cured tire carcass from which the previous tread has been buffed or abraded away and the tread cured thereon as a retread.

In the practice of this invention, the SIBR is a particularly desirable and required feature of the rubber tread. The precise structure of the SIBR rubber itself may not be entirely understood, although the styrene units in the SIBR can be random, block or tapered. It has been observed that its inclusion in the rubber blend of a tire tread has provided a tire with enhanced characteristics as a desirable combination of rolling resistance, skid resistance and treadwear.

The practice of this invention is further illustrated by reference to the following examples which are intended to be representative rather than restrictive of the scope of the invention. Unless otherwise indicated, all parts and percentages are by weight.

EXAMPLE I

Pneumatic tires of conventional construction (grooved tread, sidewalls, spaced beads, and supporting fabric-reinforced carcass) were built, shaped and cured in a conventional tire mold. The tread was built onto the uncured carcass as a pre-extruded element. The tires were of the P195/75R14 type which indicates that they were belted, radial ply passenger type tires.

One tire is identified herein as Control X and experimental tires identified as Experimental Y and Experimental Z.

Control tire X had a tread composed of (A) 50 phr butadiene/styrene rubber and (B) 50 phr natural rubber and is intended to represent a somewhat conventional passenger tire tread.

Experimental tires Y and Z had a tread composed of (A) SIBR having a Tg in the range of about −40° C., and (B) natural rubber with the tread of experimental tire Z also containing a conventional polybutadiene rubber.

Thus, the SIBR, basically, replaced at least a part of the butadiene/styrene rubber in the tread rubber blend.

The tires (X, Y and Z) were mounted on rims, inflated and submitted to testing. The test values for the control were normalized to a value of 100 for comparison purposes. The tire with the experimental tread was tested and its test values compared to the values of the control tire and reported relative to the normalized values of 100.

Surprisingly, the tire with the experimental tread rubber composition Y exhibited an equivalent rolling resistance and skid resistance while providing an improved treadwear as compared to control tire X. The tire with tread 2 demonstrated an equivalent skid resistance, and increase in rolling resistance, yet a more improved treadwear as compared to control tire X. These results are considered to be an important departure from results which might ordinarily be expected.

The tread compositions for tires X, Y and Z were comprised of materials shown in the following Table 1.

TABLE 1

| Rubber Compound | Control (X) | Parts[1] Experimental | |
|---|---|---|---|
| | | (Y) | (Z) |
| Butadiene/styrene rubber[2] oil extended (70 parts rubber, 26.25 parts oil | 50 | 0 | 0 |
| Natural rubber | 50 | 10 | 50 |
| Polybutadiene rubber[3] (1-2% vinyl) | 0 | 20 | 0 |
| SIBR I[4] | 0 | 70 | 0 |
| SIBR II[4] | 0 | 0 | 50 |
| Oil, aromatic | 9 | 9 | 9 |
| Antioxidant | 3.2 | 3.2 | 3.2 |
| Wax | 3.8 | 3.8 | 3.8 |
| Stearic acid | 2 | 2 | 2 |
| Carbon black | 45 | 45 | 45 |
| Sulfur | 0.9 | 0.9 | 0.9 |
| Accelerator | 1.9 | 1.9 | 1.9 |
| Zinc Oxide | 3.5 | 3.5 | 3.5 |

[1]Most amounts rounded to nearest tenth of a part.
[2]Emulsion polymerization prepared SBR, oil extended with typical aromatic rubber processing oil.
[3]Conventional type polybutadiene rubber (low vinyl 1,2 and high cis 1,4-).
[4]Polymer is composed of about 20 mole percent units derived from styrene, about 40 mole percent units derived from isoprene and about 40 percent units derived from 1,3-butadiene and is the SIBR described in this specification, particularly of the type shown in Experiment A of TABLE 2 herein. SIBR I has a Tg of −42° C. and SIBR II had a Tg of −31° C.

Table 2 illustrates various characteristics of the SIBR of this invention, and also the type SIBR used in this Example to prepare the Experimental Y tire, namely, Experiment A:

TABLE 2

| Product Analysis | Exp A | Exp B | Exp C | Exp D | Exp E |
|---|---|---|---|---|---|
| % Styrene | 20 | 20 | 20 | 30 | 30 |
| % Butadiene | 40 | 40 | 40 | 35 | 35 |
| % Isoprene | 40 | 40 | 40 | 35 | 35 |
| Molecular Weight (Number Average) | 350,000 | 350,000 | 350,000 | 350,000 | 350,000 |
| Molecular Weight (Weight Average) | 600,000 | 600,000 | 600,000 | 600,000 | 600,000 |
| Glass Transition Temperature | −40° C. | −20° C. | −60° C. | −40° C. | −10° C. |
| Mooney Viscosity (ML4 at 212° F.) | 80 | 80 | 80 | 80 | 80 |

Table 3 illustrates various characteristics of the (Control X) and (Experimental Y and Z) rubber compound.

TABLE 3

| Property | Control X | Exp Y | Exp Z |
|---|---|---|---|
| Tensile (MN/m$^2$) | 21 | 20 | 22 |
| Elongation (%) | 500 | 450 | 490 |
| Mooney (ML-4) | 43 | 46 | 39 |
| Rebound (0° C.) | 28 | 22 | 27 |
| Rebound (100° C.) | 67 | 70 | 73 |
| Rheology (IV, 0.5% Strain) | | | |
| Tan Delta (0° C.) | 0.256 | 0.308 | 0.279 |
| Tan Delta (60° C.) | 0.185 | 0.167 | 0.161 |

Table 4 illustrates the rolling resistance, wet and dry skid resistance and treadwear values with the Experimental Tire Y compared to values of Control Tire X normalized to 100.

TABLE 4

| Measured Values | Control X | Experimental Y | Experimental Z |
|---|---|---|---|
| Rolling resistance (67" wheel) | 100 | 99[1] | 107 |
| Twin Roll | 100 | 103 | 106 |
| Wet skid resistance (20 mph) | 100 | 99 | 100 |
| Wet skid resistance (40 mph) | 100 | 98 | 100 |
| Wet skid resistance (60 mph) | 100 | 102 | 104 |
| Treadwear | 100 | 105[2] | 110[2] |

[1] a reduction in the Rolling Resistance value is an improvement.
[2] an increase in the Treadwear value is an improvement.

The treadwear was evaluated as a measure of reduction in tread depth after about 55,000 kilometers of test on a truck.

In this Example, the rolling resistance was measured by mounting and inflating the tire on a metal rim and allowing it to be turned by a 67 inch diameter dynamometer under about 80 percent of its rated load at a rate equivalent to a vehicular speed of 50 mph and the drag force measured. The test is believed to be somewhat standard.

The skid resistance was a standard test in which the tires are mounted on a weighted, drawn trailer at various speeds and brakes of the trailer applied and skid force (peak and slide) measured.

The treadwear was compared by actually mounting both control and experimental tires on a vehicle and driving it under controlled conditions, with the position of the tires on the vehicle being periodically positionally rotated.

In this Example, the SIBR is prepared by polymerizing styrene, isoprene and 1,3-butadiene in an essentially non-polar aliphatic solvent with an alkyl lithium catalyst, namely, butyl lithium with or without a modifier. Such modifier is usually a polar modifier which has an effect of randomizing or tapering the styrene portion of the rubber depending on the ratio of the lithium to modifier. A recommended weight ratio of lithium to modifier is 2/1 to 6/1, preferably 1.5/1 to 2.5/1 weight ratio.

Representative examples of such solvents are pentane, hexane, heptane, octane, isooctane and cyclohexane, of which hexane is preferred.

Representative examples of alkyl lithium catalysts are methyl lithium, ethyl lithium, propyl lithium, n-butyl lithium, 2-butyl lithium, t-butyl lithium and amyl butyl lithium. The n-butyl lithium is preferred.

The amount of catalyst is dependent upon the molecular weight desired for the polymerization. It is preferred that the temperature of the polymerization is maintained substantially constant throughout the polymerization in the range of about 10° C. to about 120° C., preferably 60° C. to 90° C.

When a polar modifier is used for randomizing or tapering the styrene such as, for example, chelating diamines or polar ether and oxygenated compounds, the amount of polar modifiers used depends largely on the desired Tg glass-transition temperatures. If a high Tg SIBR (−10° C. to −20° C.) is desired, the modifier used can be TMEDA (N,N,N$^1$,N$^1$-tetra ethylene diamine) or diglyme. If no modifier is used, the polymerization temperature can be adjusted to randomize the styrene or taper it. The SIBR randomization without the polar modifier, is conventionally made at polymerization temperature of 90° C. to 150° C. in continuous stirred reactors.

Representative examples of chelating diamines are N,N,N',N'-tetramethylethylenediamine, dipiperdinethane, dimorpholine ethane and bis-dimethylpiperizane.

Representative examples of polar ether compounds are diglyme, monoglyme, tetraglyme and tetrahydrofuran.

Representative examples of oxygenated compounds are 2,3-dimethoxybenzene, tetrahydrofuran, and methylated polyvinyl acetate polymers.

Usually the styrene content tends to control the glass transition temperature. For high Tg (−10° C. to −40° C.) SIBR, the styrene content should be between 30–60 weight percent of the polymer. If a low Tg of the SIBR (−50° C. to −70° C.) is desired the styrene content may vary between 10 to 30 percent.

The resulting SIBR polymer (rubber) can be further characterized by its glass transition temperature based on the 1,2 bound butadiene plus styrene (formed when a modifier is used in the polymerization) in weight percent or 3,4 bound isoprene plus styrene content or both 1,2 bound butadiene and 3,4 bound isoprene plus styrene content.

High Tg SIBR polymer can have a low styrene content with high 3,4 bound isoprene content (from the isoprene component) and 1,2 bound butadiene (from the butadiene component) or high styrene with low 3,4 bound isoprene (in the isoprene component) and 1,2 bound butadiene (in the butadiene component) depending on the desired properties needed to be maximized.

Thus, if a relatively low Tg SIBR is desired, a high styrene content is the primary consideration. If a relatively high Tg SIBR is desired, at a constant or given styrene content, the primary consideration is for a high concentration of the sum of the 1,2-structure of the bound butadiene units plus the 3,4-structure of the bound isoprene units.

Tire treads having a high Tg (−30° C. to −45° C.) SIBR is considered desirable for high traction purpose. A low Tg (−70° C. to −40° C.) SIBR is desirable for tread wear purposes and a balanced property of SIBR of −20° C. to −30° C. is usually good for ice traction.

EXAMPLE II

SIBR was made by polymerizing the styrene, isoprene and 1,3-butadiene monomers with n-butyl lithium catalyst and TMEDA modifier to make a −50° C. Tg and −40° C. Tg and −30° C. Tg and −20° C. Tg rubber terpolymers as illustrated in the following tables and identified as Experiments F through L:

TABLE 5

|  | Exp F | Exp G | Exp H | Exp I |
|---|---|---|---|---|
| Lithium/Modifier Ratio | 1/1 | 1/1.5 | 1/2 | 1/2.5 |
| Molecular Weight (Number Average) | 250,000 | 250,000 | 250,000 | 250,000 |
| Molecular Weight (Weight Average) | 450,000 | 450,000 | 450,000 | 450,000 |
| Tg (°C.) | −50° | −40° | −30° | −20° |
| % Styrene | 20 | 20 | 20 | 20 |
| % Isoprene | 40 | 40 | 40 | 40 |
| % Butadiene | 40 | 40 | 40 | 40 |
| Microstructure |  |  |  |  |
| % 1,2 structure in polybutadiene | 30 | 40 | 45 | 50 |
| % 3,4 structure in polyisoprene | 25 | 30 | 35 | 50 |

This demonstrates that the microstructure of the polymer (the 1,2 structure in the butadiene portion and/or the 3,4 structure in the isoprene portion) relates to the Tg of the SIBR terpolymer.

TABLE 6

|  | Exp J | Exp K | Exp L |
|---|---|---|---|
| Lithium/Modifier Ratio | 1/1 | 1/1.5 | 1/2.5 |
| Molecular Weight (Mn) | 250,000 | 250,000 | 250,000 |
| Molecular Weight (Mw) | 450,000 | 450,000 | 450,000 |
| Tg (°C.) | −50° | −30° | −20° |
| % Styrene | 30 | 40 | 50 |
| % Isoprene | 35 | 30 | 25 |
| % Butadiene | 35 | 30 | 28 |
| Microstructure |  |  |  |
| % 1,2 structure in polybutadiene | 12 | 12 | 12 |
| 3,4 structure in polyisoprene | 10 | 10 | 10 |

This demonstrates that the styrene content can control the Tg of the SIBR terpolymer.

The glass transition temperature (Tg) can conveniently be determined by method known to those having skill in such art, namely, by differential scanning calorimeter (DSC) at a heating rate of 10° C. per minute. For the SIBR of this invention, basically, single-type Tg's were observed.

Additional Disclosure and Practice of Invention

In the further practice of this invention, the following Examples are presented to exemplify the invention and to further present a desired mode of carrying out the invention.

In further practice of the invention, a linear styrene, isoprene, butadiene terpolymer rubber (hereinafter SIBR) is provided which is comprised of (1) about 5 to about 40, preferably about 5 to about 15 or 20, about 8 to about 25 or about 15 to about 25, weight percent bound styrene: (2) about 25 to about 65, preferably about 20 to about 50, 30 to about 40, or about 40 to about 50 or up to about 60 weight percent bound isoprene: and (3) about 8 to about 50, preferably about 8 to about 25, about 15 to about 30, about 20 to about 40, or about 40 to about 50 weight percent bound butadiene and is characterized by having a glass transition temperature in the range of about −10° C. to about −75° C., preferably about −20° C. to about −40° C. or about −20° C. to about −75° C. a heterogeneity index in the range of about 1.5 to about 2.4, a ML4(100° C.) viscosity in the range of about 70 to about 100, and further characterized in that at least 98 percent of its styrene is contained in sequential styrene units of 5 or less, and at least 75 percent of its styrene is contained in sequential styrene units of 2 or less and the bound butadiene structure contains about 8 to about 50, preferably about 8 to about 25, about 20 to about 35 or about 30 to about 40 percent 1,2-vinyl units with the remainder being essentially composed of 1,4-configured units, the said bound isoprene structure contains about 8 to about 50, preferably about 12 to about 18, 20 to about 35, or about 30 to about 50, percent 3,4 vinyl units with the remainder being essentially 1,4-configured units with less than about 2 percent 1,2-configured units and the sum of the said percent 1,2-vinyl units of the bound butadiene and the percent 3,4 units of the bound isoprene is in the range of about 20 to about 90, preferably about 20 to about 45.

The SIBR is considered to be a linear terpolymer in view of absence of chain branching. For example, it is typically soluble in toluene and thus, indicative of an absence of gel.

The styrene component of the SIBR is considered to be non blocky particularly because, in a preferred aspect, at least 75 percent of the styrene structure is in sequential styrene units of 2 or less and at least 98 percent of the styrene structure is in the form of 5 or less sequential styrene units. This value is determined by ozonalysis of the raw (uncured) gum rubber (terpolymer) and can be determined from the sulfur cured compounded terpolymer rubber. A representative ozonalysis procedure has been published by Dr. Yasuyuki Tanaka of the Tokyo University of Agriculture and Technology. For example, reference can be made to Rubber Chem and Tech Journal, volume 59, page 16 (1986).

In further accordance with this invention, such an SIBR is provided having a Mooney viscosity (ML4 at 100° C.) in the range of about 45 to about 100, preferably about 70 to about 100, preferably about 65 to about 90, thus, preferably having a relatively high viscosity. Such characteristic is considered beneficial. The sulfur cured compounded terpolymer rubber can be used in a tire tread formulation to provide a tire with good traction and wear properties. If a lower viscosity is desired, the rubber can be oil extended and the desired Mooney value will depend on the amount of oil used. The determination of Mooney viscosity and use of oil extension is well known to those having skill in such art.

In further accordance with this invention, such an SIBR is provided having a ratio of molecular weight number average (Mn) to molecular weight average (Mw) in the range of about 1.5 to about 2.4 (preferably about 2 to about 2.4), thus, indicating a relatively narrow molecular weight distribution. It is often referred to as an heterogeneity index (HI). Such characteristic is considered beneficial because the rubber can exhibit enhanced dynamic properties such as, for example, better dynamic properties. These values are determined by conventional methods well known to those having skill in such art.

In further accordance with this invention, such an SIBR is provided having a Tg in the range of about −10° C. to about −40° C. characterized in that its bound styrene content is in the range of about 15 to about 40 weight percent, its bound isoprene content is in the range of about 30 to about 60 percent and its bound butadiene content is in the range of about 10 to about 25 percent, and the sum of the weight percent 1,2 vinyl units of the bound butadiene and the weight percent 3,4 units of the bound isoprene is in the range of about 20 to about 45.

In further accordance with this invention, such an SIBR is provided having a Tg in the range of about −10° C. to about −40° C. characterized in that is bound styrene content is in the range of about 8 to about 20 weight percent, its bound isoprene is in the range of about 40 to about 60 percent and its bound butadiene is in the range of about 10 to about 25 percent; where the bound butadiene structure contains about 10 to about 25 percent 1,2 vinyl units and the bound isoprene structure contains about 8 to about 20 percent 3,4 units and where the sum of the weight percent 1,2 vinyl units of the bound butadiene and the weight percent 3,4 units of the bound isoprene is in the range of about 45 to about 90.

In a further aspect, such an SIBR is provided having a Tg in the range of about −50° C. to about −70° C. characterized in that its bound styrene is in the range of about 10 to about 30 weight percent, its bound isoprene is in the range of about 30 to about 50 percent, its bound butadiene is in the range of about 20 to about 40 percent, the bound isoprene structure contains about 8 to about 20 percent 3,4 units and the bound butadiene structure contains about 10 to about 25 percent 1,2 vinyl units and where the sum of the weight percent 1,2 vinyl units of the bound butadiene and the weight percent 3,4 units of the bound isoprene is in the range of about 18 to about 45.

More specifically and in further accordance with this invention, a pneumatic tire is provided having an outer circumferential tread where said tread is a sulfur cured rubber composition comprised of, based on 100 parts by weight rubber (phr), (A) about 10 to about 90, preferably about 70 to about 90 or about 55 to about 85 parts by weight of the said styrene, isoprene, butadiene terpolymer (rubber) (SIBR) and, accordingly, (B) about 90 to about 10 and preferably about 30 to about 10 or about 45 to about 85 weight percent of at least one of cis 1,4-polyisoprene rubber, cis 1,4-polybutadiene rubber, styrene/butadiene copolymer rubber and 3,4-polyisoprene rubber and medium vinyl polybutadiene rubbers.

In a further aspect of this invention, a pneumatic rubber tire is provided having a tread composed of, based on 100 parts by weight rubber, (A) about 70 to about 90 parts by weight of the SIBR of this invention; and (B) about 30 to about 10 parts by weight natural rubber.

In a further aspect of this invention, a pneumatic rubber tire is provided having a tread composed of a sulfur cured rubber composition which is comprised of, based on 100 parts by weight rubber, (A) about 60 to about 84 parts by weight of the SIBR of this invention; and (B) about 8 to about 20 parts by weight natural rubber: and (C) about 8 to 20 parts by weight of at least one of cis 1,4-polybutadiene rubber high vinyl polybutadiene rubber having a 1,2-content in the range of about 50 to about 80 percent 3,4-polyisoprene rubber, styrene/butadiene copolymer rubber derived from aqueous emulsion polymerization and styrene/butadiene copolymer rubber derived from organic solvent solution polymerization where the styrene/butadiene ratio of such copolymer rubbers is in the range of about 20/80 to about 50/50 preferably the (C) rubber is cis 1,4-polybutadiene rubber.

Important aspect of the invention are the defined characteristics of the SIBR composition and structure itself together with the morphology of the blends of the defined SIBR and other selected rubbers, particularly for utilization in tire treads.

The advantageous morphology of prescribed blends of the defined SIBR and cis 1,4-polyisoprene, or natural rubber, can be described as unique and unusual lamellar, rod and sphere morphologies which means a well defined arrangement of the polymer components in the SIBR.

The advantageous morphology of prescribed blends of the defined SIBR and cis 1,4-polybutadiene can be defined as selectively distributing the carbon black in various components of the rubber blend which means that the filler distribution is controlled by such blends and the black can be selectively distributed in either or both of the phases.

The advantageous morphology of the prescribed blends of the defined SIBR and high vinyl polybutadiene rubber can be described as being beneficial in that it provides a non-uniform distribution of carbon black and helps traction properties of a tire tread which is composed of such rubber blend. Such black distribution is accomplished by phase mixing of the components.

The advantageous morphology of the prescribed SIBR and aqueous emulsion derived butadiene/styrene copolymer rubber can be described as uniform and arrangement of the phase to control filler (carbon black) distribution. This is accomplished by phase mixing.

The advantageous morphology of the prescribed SIBR and organic solution polymerization derived styrene/butadiene copolymer rubber can be described as unique which is not contaminated by emulsifiers.

The term "morphology" as applied to the respective rubber blends refers to the rubber blends in their compounded and sulfur cured state and can generally be described as well distributed creatures and that the better is uniquely in the our phase. This means that the curative distribution can be controlled by the use of SIBR in various rubber blends.

The SIBR is prepared as a continuous process and thus, with the aid of the aforesaid combination of lithium catalyst and polar modifier (weight ratio in a range of about 1/1 to about 2/1) yields a linear terpolymer in which its styrene is substantially non-block or block free. Correspondingly, the butadiene and isoprene are considered to be substantially non-blocky.

The following example is presented to further illustrate the invention.

EXAMPLE III

Several SIBR's were prepared by the method generally illustrated in Example I and discussed in this additional disclosure. A two reactor continuous reaction system was used with all of the monomers (styrene, isoprene and 1,3-butadiene), catalyst and polar modifiers being introduced substantially simultaneously in the first reactor. The first reactor was operated in a temperature range of about 70° C. to about 90° C. and a residence time for the materials was about one hour. The materials were fed from the first reactor to a second reactor, on a continuous basis where the polymerization was continued at a temperature in the range of about 90° C. to about 100° C. with a residence time for the materials of about two hours. The polymerizate was recovered from the second continuous reactor by desolvatization which is accomplished by simple steam stripping, and the terpolymer recovered therefrom.

Table 7 represents the additional SIBR's which are identified herein for the purpose of illustration as Experiments F and G.

EXAMPLE IV

An SIBR is prepared as in Example III where all of the polar modifier(s) are introduced between the first and second reactor.

TABLE 7

| SIBR | EX F | EX G |
|---|---|---|
| % Styrene | 25 | 20 |
| % Isoprene | 48 | 60 |
| % Butadiene | 27 | 20 |
| Tg | −24° C. | −20 |
| Mooney Viscosity (ML-4) | about 80 | about 80 |
| Butadiene Structure | | |
| % 1,2-butadiene | 44 | 20 |
| % 1,4-butadiene | 56 | 80 |
| Isoprene Structure | | |
| % 3,4-polyisoprene | 44 | 20 |
| % 1,4-polyisoprene | 56 | 80 |
| % 1,2-polyisoprene | -0- | -0- |
| Isoprene/Butadiene Ratio | 1.8 | 3.0 |
| % Styrene with a maximum of 2 sequential styrene units | 98 | 98 |
| % Styrene with a maximum of 5 sequential units | 75 | 75 |
| Molecular weight (Mn) average | about 350,000 | about 350,000 |
| Ratio of Mn/Mw (HI) | about 2.1 | about 2.3 |

A blend of the SIBR of Experiments F-H are made with various other rubbers for the purpose of utilization as a tire tread similar to Example II herein. Representative rubber blends are shown in Table 8.

TABLE 8

| Rubber | EX L | EX M | EX N | EX O | EX P |
|---|---|---|---|---|---|
| Natural Rubber | 10 | 10 | 10 | 10 | 10 |
| Cis 1,4-Polybutadiene Rubber | — | 10 | — | — | — |
| Butadiene/Styrene Rubber | — | — | 10 | — | — |
| 3,4-Polyisoprene Rubber | — | — | — | — | 10 |
| SIBR (Ex F) | — | 80 | 80 | 90 | 80 |
| SIBR (Ex G) | 90 | — | — | — | — |

Pneumatic rubber tires are then prepared with treads of the rubber blends, namely, the blends of Experiments L, M, N, O, and P.

While certain representative embodiments and details have been shown for the purpose of illustrating the invention, it will be apparent to those skilled in this art that various changes and modifications may be made therein without departing from the spirit or scope of the invention.

What is claimed is:

1. A linear styrene, isoprene, butadiene terpolymer rubber (SIBR) which is comprised of (1) about 6 to about 40 weight percent bound styrene; (2) about 20 to about 65 weight percent bound isoprene; and (3) about 10 to about 50 weight percent bound butadiene and is characterized by having a single glass transition temperature (Tg) which is in the range of about −10° C. to −75° C. a heterogeneity index in the range of about 1.5 to about 2.4 and a ML4(100) viscosity in the range of about 70 to about 100, and further characterized in that at least 98 percent of its styrene is contained in sequential styrene units of 5 or less, and at least 75 percent of its styrene is contained in sequential styrene units of 2 or less and the bound butadiene structure contains about 8 to about 40 percent 1,2-vinyl units with the remainder being essentially composed of 1,4-configured units, the said bound isoprene structure contains about 8 to about 50 percent 3,4-vinyl units with the remainder being essentially 1,4-configured units with less than about 2 percent 1,2-configured units and the sum of the said percent 1,2-vinyl units of the bound butadiene and the percent 3,4 units of the bound isoprene is in the range of about 20 to about 90.

2. The SIBR of claim 1 which is composed of (1) about 8 to about 25 weight percent bound styrene; (2) about 20 to about 50 weight percent bound isoprene; (3) about 10 to about 25 weight percent bound butadiene and is characterized by having a single Tg which is in the range of about −20° C. to about −40° C. and where the bound butadiene structure contains about 20 to about 35 percent 1,2-vinyl units, the bound isoprene structure contains about 20 to about 35 percent 3,4-vinyl units and the sum of the said percent 1,2-vinyl unit of the bound butadiene and the 3,4 units of the bound isoprene is in the range of about 40 to about 70.

3. The SIBR of claim 1 which is composed of (1) about 15 to about 25 weight percent bound styrene; (2) about 40 to about 60 weight percent bound isoprene; (3) about 20 to about 40 weight percent bound butadiene and is characterized by having a single Tg which is in the range of about −20° C. to about −40° C. and where the bound butadiene structure contains about 8 to about 40 percent 1,2-vinyl units, the bound isoprene structure contains about 8 to about 50 percent 3,4-vinyl units and the sum of the said percent 1,2-vinyl units of the bound butadiene and the 3,4 units of the bound isoprene is in the range of about 20 to about 90.

4. The SIBR of claim 1 which is composed of (1) about 6 to about 15 weight percent bound styrene; (2) about 25 to about 65 weight percent bound isoprene; (3) about 20 to about 40 weight percent bound butadiene and is characterized by having a single Tg which is in the range of about −60° C. to about −75° C. and where the bound butadiene structure contains about 10 to about 18 percent 1,2-vinyl units, the bound isoprene structure contains about 8 to about 12 percent 3,4-vinyl units and the sum of the said percent 1,2-vinyl units of the bound butadiene and the 3,4 units of the bound isoprene is in the range of about 20 to about 30.

5. The SIBR of claim 1 which is composed of (1) about 6 to about 20 weight percent bound styrene; (2) about 30 to about 40 weight percent bound isoprene; (3) about 40 to about 50 weight percent bound butadiene and is characterized by having a single Tg which is in the range about −40° C. to about −60° C. and where the bound butadiene structure contains about 10 to about 25 percent 1,2-vinyl units, the bound isoprene structure contains about 12 to about 18 percent 3,4-vinyl units and the sum of the said percent 1,2-vinyl units of the bound butadiene and the 3,4 units of the bound isoprene is in the range of about 22 to about 43.

* * * * *